United States Patent [19]

Sheldon

[11] 4,296,404

[45] Oct. 20, 1981

[54] REMOTE VERIFICATION LOCKOUT SYSTEM

[75] Inventor: James R. Sheldon, Phoenix, Ariz.

[73] Assignee: Engineered Systems, Inc., Tempe, Ariz.

[21] Appl. No.: 85,895

[22] Filed: Oct. 18, 1979

[51] Int. Cl.³ .......................... G06K 5/00; H04Q 3/02
[52] U.S. Cl. ................................. 340/149 A; 235/380
[58] Field of Search ...................... 340/149 A, 149 R; 235/380

[56] References Cited

U.S. PATENT DOCUMENTS

| 3,859,634 | 1/1975 | Perron | 340/149 A |
| 4,114,027 | 9/1978 | Slater | 340/149 A |
| 4,114,140 | 9/1978 | Kubina | 340/149 A |

Primary Examiner—Harold I. Pitts
Attorney, Agent, or Firm—LaValle D. Ptak

[57] ABSTRACT

A remotely controlled verification lockout of the verification memory used in conjunction with fuel dispensing systems, service dispensing systems (such as automatic bank tellers), and the like is provided. At each user location, a verification memory is provided in which a single binary data bit is stored at each different verification address location. Each document or credit card used with the system has unique identifying information encoded on it for addressing a specific location in the memory which corresponds to the verification check for that credit card. Provision is made for automatically initializing the status of all of the information stored in all of the verification memories in the system by the transmission of an initializing signal to those memories from a central processor by way of suitable communications lines. In addition, on a periodic basis or at irregular intervals a change in the status of any address location in the verification memory may be effected by the central processor transmitting a control character which is decoded by logic at the fuel dispensing station to place the verification memory in its "write" mode of operation. This character then is followed by the addresses of the various memory locations which are to be changed or updated, and those addresses are changed accordingly. Thus, each of the different memory locations which are to be changed are individually addressed to establish the "valid" or "non-valid" binary data bit storage at the location corresponding to the different credit cards for which the verification memory status is being changed.

5 Claims, 4 Drawing Figures

REMOTE VERIFICATION LOCKOUT SYSTEM

RELATED PATENT

The subject matter of this application is related to the system disclosed in the patent to John Kubina, U.S. Pat. No. 4,114,140, issued Sept. 12, 1978 and assigned to the same assignee as the present application.

BACKGROUND OF THE INVENTION

The Kubina U.S. Pat. No. 4,114,140 is directed to a system for checking the validity of a credit document quickly and easily at the location where the document itself is used and which further requires a minimum memory capacity in order to effect the necessary document check. The system of the Kubina patent is used with an automated product dispensing system for dispensing products such as fuel for large fleet users or for private owners. Such systems are also used for effecting banking transactions during hours when banks normally are closed and for other types of credit card operated systems. Generally in such systems, a card reader control panel or control station is employed; and the transaction is initiated by an insertion of an identified credit card into a card reader by the customer or user of the system. Such cards are uniquely encoded with indicia particularly identifying the customer or user and, in many cases, include other indicia to limit the type and quantity of product which may be purchased or withdrawn from the system in response to the use of the card.

In the system disclosed in the Kubina patent, at least some of the data on the card used used with the system is employed for verification of the validity for use of that card to conduct the desired transaction. In the Kubina system, such verification is done locally at the user terminal. Each card is uniquely identified with a verification binary word (typically a four-bit word) which identifies the card. This word then is compared against the same word stored in a memory where it is then identified as being either "valid" or "non-valid" for conducting the transaction. Often it is necessary for the status of a card used with a system to be changed from a "valid" to a "non-valid" status for various reasons. If a credit card is stolen, the identity of that card must be changed in the verification logic of the system to a "non-valid" status; so that it cannot be used to carry out transactions with the system. Other situations arise such as where a customer falls behind in payments, so that it becomes necessary to prevent that customer from using the system until his account is satisfactorily brought up to date.

The Kubina patent discloses a system for permitting the verification logic to be changed to indicate the "non-valid" status of specific cards or customers used with the system whenever desired. In the Kubina system, however, the status change is effected by manually setting switches associated with the verification memory at the fuel dispensing site or utilization site where the memory is located. If there are a large number of potential sites at which the card which is to be "locked out" may be used, it is necessary to manually effect the verification lockout setting with the memory at each one of these different sites or locations. If changes in the status of cards used with the system occur infrequently, such an "on site" manual setting of the verification logic is not particularly inconvenient.

If the locations are widely dispersed, however, or if frequent changes in the validity status of cards used with a system become necessary, it is desirable to effect a change in the verification lockout memory from a central location. Ideally, such a change in the lockout memory file should be effected automatically on command from a central remote location as frequently as becomes necessary during the use of the system. This is particularly desirable in conjunction with fuel dispensing systems where the fuel dispensing locations are scattered over a large area and which may involve thousands of individual cards and/or customers using the system at any given time.

SUMMARY OF THE INVENTION

Accordingly, it is an object of this invention to provide an improved verification checking system.

It is another object of this invention to provide an improved credit card verification system in which the verification memory is easily updated.

It is an additional object of this invention to provide a simplified credit card verification checking system in which the verification memory may be remotely modified.

It is a further object of this invention to provide an improved, remote updating of a verification memory used in conjunction with a credit document verification system for effecting unattended business transactions.

In accordance with the preferred embodiment of this invention, a verification checking system for providing a verification check of uniquely encoded multi-bit binary words includes a read/write verification memory. This memory has a number of address locations in it for uniquely storing a "valid" or "non-valid" indicia corresponding to each of the different multi-bit verification words used in conjunction with the system. A mode controlling switch and an address decoding circuit are employed in conjunction with the transaction verification memory and respond to verification updating messages transmitted from a remote central location to uniquely change the verification data of different address locations in the verification memory.

DETAILED DESCRIPTION

Figure 1:
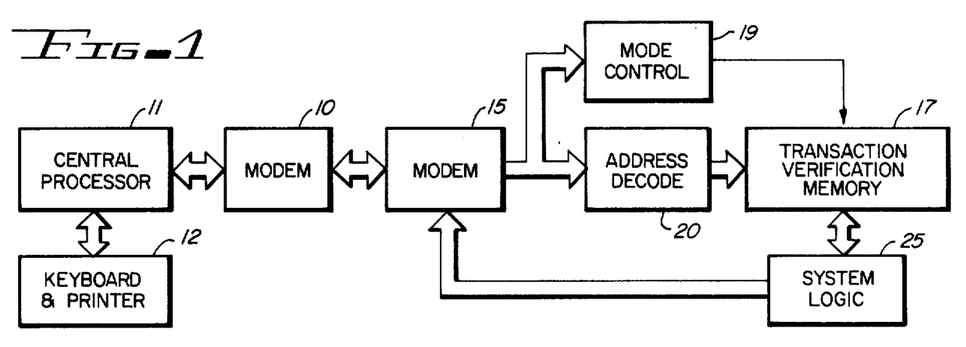
FIG. 1 is a block diagram of a preferred embodiment of the invention.

The system shown in FIG. 1 is a modification to the system shown in FIG. 1 of the above mentioned Kubina U.S. Pat. No. 4,114,140 which permits the validity check logic portion of the system of the Kubina patent to be remotely updated on demand from a central processor. The local operation of the system of the '140 patent is otherwise the same. Consequently, the system shown in FIG. 1 adds additional flexibility to the system of the '140 patent, particularly where a large number of fuel dispensing locations, all programmed for use with the same set of customers, are employed.

In the system of FIG. 1 all of the data from the different outlying fuel dispensing terminals are transmitted through a central processor modem 10 to a central station or processor 11 which is conveniently located for gathering in all of the accounting data, etc. from the various product dispensing terminals with which the system is used. The central processor 11 may be any suitable printer with keyboard and/or general purpose computer and the necessary peripheral equipment, such as a keyboard and printer 12 shown in FIG. 1. Interaction between the keyboard and printer 12 and the central processor 11 for the entering of data into and the obtaining of data from the central processor 11 is effected in a conventional manner. The modem 10 then may be used in conjunction with a manual or automatic dialer to dial a conventional telephone line or the like corresponding to any one or more of the outlying fuel dispensing system locations, or to interconnect the central processor 11 with a specific fuel dispensing location by means of a dedicated line. Such modems and dialers are conventional, and for that matter have not been disclosed in detail in FIG. 1.

At each of the fuel dispensing terminals used with the system is another modem 15 which similarly is used to interconnect the fuel dispensing terminal with which it is associated with the modem 10 at the central processor terminal. The interconnections between these modems 10 and 15 are indicated as two way interconnections, since data is transferred in both directions between the modems 10 and 15.

As is explained in the disclosure of U.S. Pat. No. 4,114,140, a transaction verification memory for determining the "valid" or "non-valid" status of any card used with the system is employed for conducting a validity check on each card or set of cards at the beginning of each transaction. This memory is indicated as the transaction verification memory 17 in FIG. 1. Preferably the transaction verification memory 17 has a single bit location corresponding to each 4 bit or multi-bit verification word encoded on the cards used with the system. The memory 17, however, also could store the entire verification designation, if desired. This later approach, however, is wasteful of memory and generally is not likely to be employed.

Figure 2:
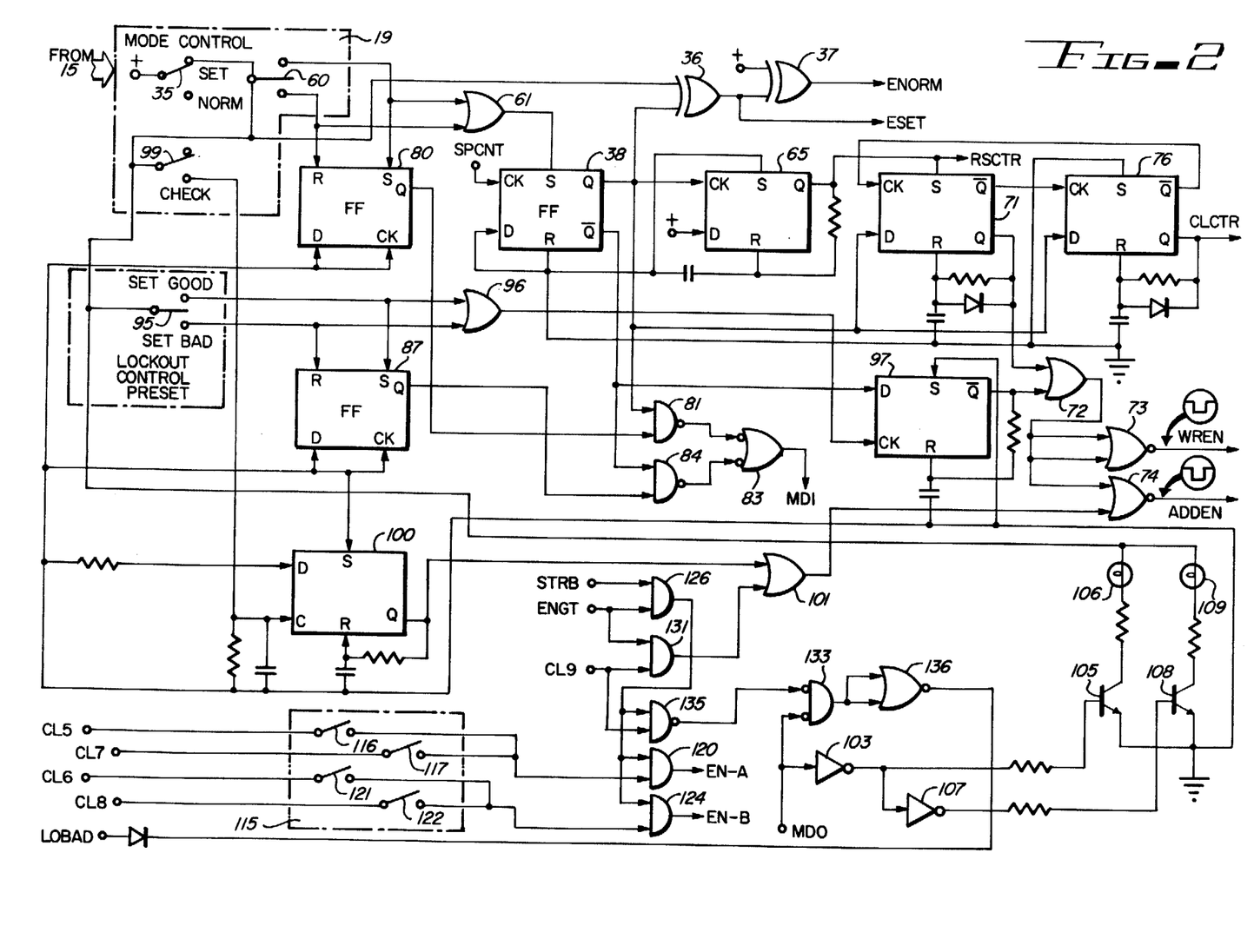
FIGS. 2, 3 and 4 are detailed block diagrams of a portion of the embodiment shown in FIG. 1.
Figure 3:
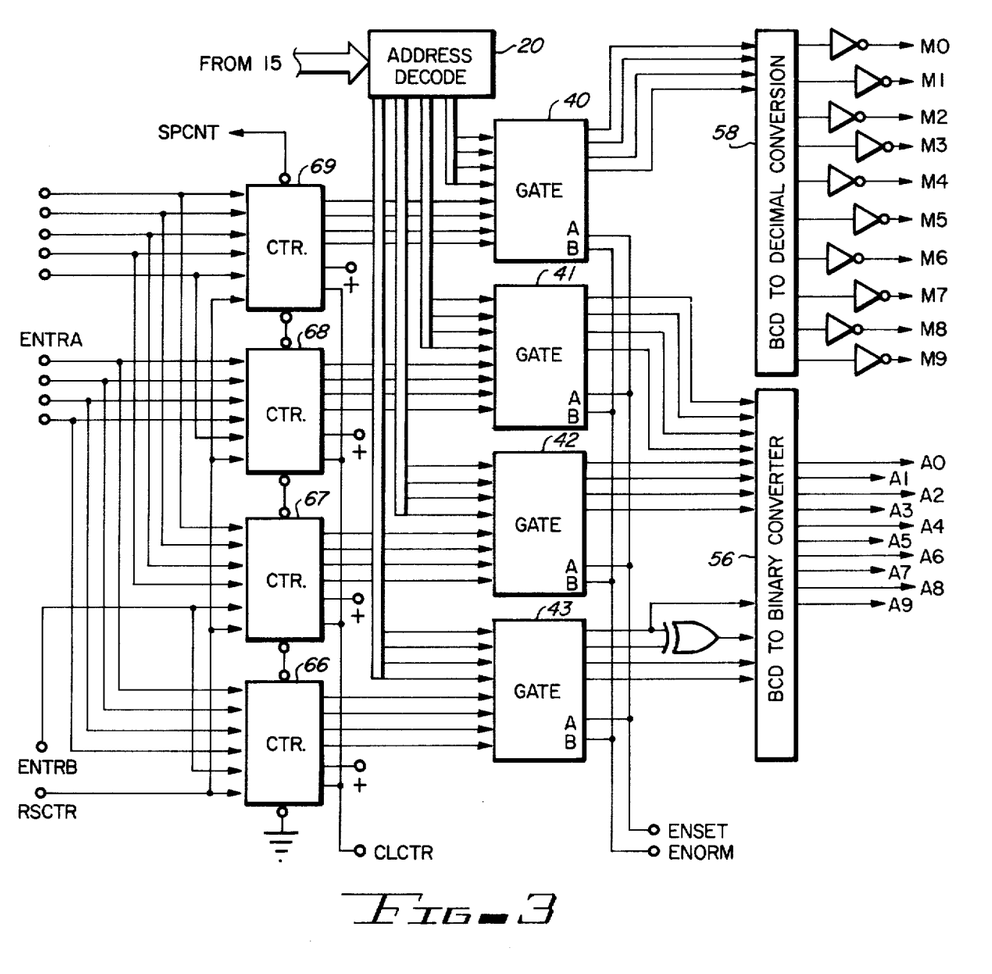
Figure 4:
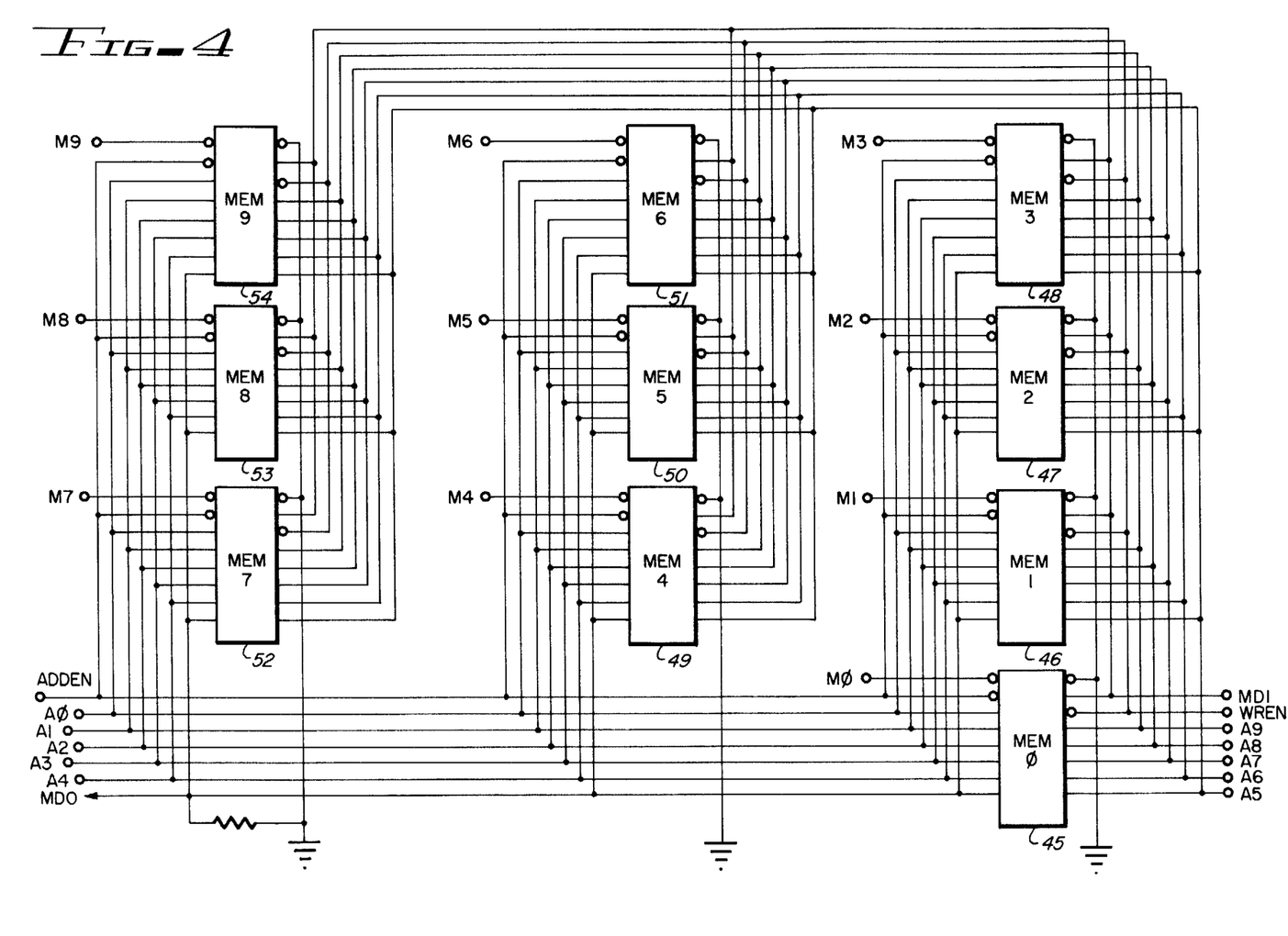

For the purpose of updating the "valid" or "non-valid" status of various credit documents or credit cards to be used with the system, the central processor 11 either periodically or on demand transmits a verification memory update to the desired terminals or terminal for changing or updating the verification status of the validity check information stored in the transaction verification memory 17. When this information is received by the modem 15 and translated through it, it is applied first to a mode control switching circuit 19 which places the transaction verification memory 17 in its "write" mode of operation. The address codes for the addresses to be "locked out" or otherwise modified in the transaction verification memory then are transmitted sequentially from the central processor 11 through the modems 10 and 15 to an address decode logic circuit 20, which specifically addresses the transaction verification memory location corresponding to that address in a conventional manner. The information then is written into the position of the transaction verification memory 17 corresponding to the selected address. The transaction verification memory 17 can either be selectively updated to change specific addresses of the "lock out" file, or the entire memory may be updated, depending upon the particular requirements of the system. The remainder of the system logic for operating in conjunction with the transaction memory 17 is shown as a system logic block 25, and additional details of that logic are shown in FIGS. 2, 3 and 4. The system logic interfaces with the transaction verification memory 17 and also supplies the transaction information to the modem 15 for transmittal to the central processor 11 in accordance with the particular system requirements. The manner and times of transmission of this data are not important to an understanding of the remote control of the lock out verification of the transaction verification memory 17.

Reference now should be made to FIG. 2, which illustrates the control portion of the validity and check logic circuit used in conjunction with the transaction verification memory and which forms a portion of the system logic 25 of FIG. 1. This circuitry is used to establish the different modes of operation of the validity check logic in conjunction with the transaction verification memory 17. The system operating mode primarily is controlled by the mode control switch 19, which is illustrated as a single-pole, double-throw switch 35. This is an electronic switch "moved" to its upper or "set" position for preparing the initial condition of operation of the transaction verification memory 17 associated with the validity check logic circuit portion of the system logic 25, and for subsequently setting data into specific locations of addresses of the memory 17 or for checking the status of the data stored at specific memory addresses. The mode of operation of the switch 19 is established in conjunction with a mode control code transmitted from the central processor through the modem 15 and decoded by logic (not shown since it is conventional) in the mode control circuit 19 to operate the electronic switch 35, to the appropriate "set" or "normal" operating position.

When the switch 35 is in its lowermost position as shown in FIG. 2, this is the normal operating position for the system and it is used to place the memory 17 used in the verification circuit in a read only memory (ROM) mode of operation. This is accomplished by a pair of EXCLUSIVE OR gates 36 and 37, which are cascaded to the upper terminal of the switch 35. The gate 36 has one input connected directly to this upper terminal and the other input obtained from the "Q" output of a control flip-flop 38. Normally this output is low; so that in the normal mode of operation both inputs to the EXCLUSIVE OR gate 36 are low, causing its output also to be low. This results in a high output from the gate 37 and the outputs of the gates 36 and 37, labeled ESET and ENORM thus are low and high, respectively.

These outputs are applied to the "A" and "B" control inputs of four switch gates, 40, 41, 42 and 43 (FIG. 3), each of which functions as a four-pole, double-throw switch to alternatively interconnect either the upper four inputs of each of these switches with the four outputs thereof or the lower four inputs with the four outputs under control of the state of the outputs of the gates 36 and 37. Whenever a high or positive output appears on the ENORM input to the switch gates 40 to 43, the lower four inputs are connected with the respective outputs of the gates. Similarly whenever a high input is applied to the "A" inputs (ENSET) of these four gates, the upper four inputs of the gates are interconnected with their respective outputs. Thus, for the normal mode of operation of the system, the lower four inputs of the switch gates 40 to 43 are interconnected with their outputs.

Now assume that the system is first brought into operation, requiring an initial set of conditions to be established in the verification logic system to permit its programming for performing subsequent credit card verification checks. The switch 35 then is moved from its lowermost (NORM) operating position to its uppermost (SET) position (as shown in FIG. 2). This is accomplished in response to a transmitted verification logic update mode control word from the central processor 11. When the switch 35 is in this condition of operation, a positive potential is applied to the upper input of the EXCLUSIVE OR gate 36 which initially reverses the condition of the outputs of the gates 36 and 37 from that described previously.

To "initiallize" or set up these beginning operating conditions a bank of ten read/write memories 45 through 54 (FIG. 4) are programmed to store the same binary condition at each address location in the memory. Each of these memories 45 through 54 comprises a 1000 bit memory, and each bit is separately and uniquely addressed by signals appearing on ten address leads illustrated in FIG. 4 in two sets, A0 through A4 and A5 through A9, respectively. The signals on these address leads are supplied to the memory from a BCD-to-binary converter 56 (FIG. 3), which in turn is provided with input signals from the twelve output leads of the switch gates 41, 42 and 43. The outputs of the BCD-to-binary converter 56 are capable of 1000 different combinations to uniquely address each of the 1000 memory positions of each of the memories 45 through 54. Selection of the particular memory to respond to the addresses on the leads A0 through A9 is effected by the outputs of the switch gate 40 which are applied to a BCD-to-decimal converter circuit 58 (FIG. 3). The BCD-to-decimal converter circuit 58 has ten outputs, supplied through buffer inverting amplifiers to provide a memory selection output on one of ten leads M0 through M9 at any given time, in response to the outputs of the gate 40. Thus, the combination of the outputs of the BCD-to-binary converter 56 and the BCD-to-decimal converter 58 are capable of uniquely selecting any one of the 10,000 different address locations in the ten 1000-bit memory chips 45 through 54.

To initially set the system to store all "valid" or all "non-valid" verification information in all of the memory locations in all of the memories 45 through 54, an initiallizing switch 60, illustrated as a single-pole, double-throw switch (although ideally this is an electronic switch) is operated, in response to an initializing signal received from the central processor 11 through the modem 15, by moving from its normal unconnected central location to momentarily contact either its upper contact (initialize "valid") or its lower contact (initialize "non valid") to supply a momentary positive pulse over the selected lead. Whichever of these conditions is selected, a pulse is passed by an OR gate 61 to trigger the set input of the flip-flop 38 to cause its "Q" output to go high. This then causes the condition of the outputs of the EXCLUSIVE OR gates 36 and 37 to be low and high, respectively, which is the same condition of operation as exists for normal operation of the system, as described previously.

The normal output condition of the flip-flop 38 is for its "Q" output to be low; so that when this output goes high, a clock pulse is applied to the clock input of a one-shot multivibrator 65 to trigger it to its astable condition of operation. This causes a short duration positive pulse to appear on the "Q" output of the multivibrator 65; and this pulse is applied to the reset counter input, RSCTR, of a jam input counter comprising four 4-stage cascaded digital counters 66, 67, 68 and 69 (FIG. 3) to set all of these counters to the zero count or zero state of operation. In other words, the initial pulse from the output of the one-shot multivibrator 65 is used to clear the counters 66 to 69. These counters normally are operated in a serial mode (jam inputs disabled) since the jam enabling inputs ENTRA and ENTRB are at a "low" potential.

This same pulse is applied to the set input of another one-shot multivibrator 71 to trigger it to its astable condition of operation. This causes a short duration positive-going pulse to be applied through an OR gate 72 to a pair of NOR gates 73 and 74. At the same time Q output of the mode of the multivibrator 71 switches from its normally high output to a momentarily low output pulse. At the end of the time out period of the multivibrator 71, the Q output goes high to trigger a cascaded one-shot multivibrator 76 into its astable condition of operation. The Q output of the multivibrator 76 is connected to the clock input of the multivibrator 71, and together they function as a free running pair of multivibrators once the initial trigger pulse has been applied to the multivibrator 71 from the multivibrator 65.

Each time the multivibrator 76 is triggered into its astable state of operation, a high output pulse of short duration appears on the "Q" output of the multivibrator. This comprises the clock pulse (CLCTR) to the counter, and this pulse is applied to all of the counters 66 through 69 to operate these counters as a conventional BCD counter, with the counter 66 comprising the input stage since its signal input terminal is permanently grounded. Thus, the counters 66 through 69 operate to count the 10,000 pulses, corresponding to the 10,000 addresses for the memory units 45 through 54. The outputs of the counters 66 through 69 are applied to the switch gates 40 through 43 and are coupled to the outputs of these gates since the output of the EXCLUSIVE OR gate 37 is high at this time and the output of the gate 36 is low.

As described previously, the outputs of the switch gate 40 are applied to the BCD-to-decimal converter 58 to select one of the ten memories 45 through 54 (FIG. 4) to respond to signals on the address leads. The outputs of the gates 41 through 43 are applied to the 12 inputs of the BCD-to-binary converter circuit 56 which in turn produces the unique combinations of outputs necessary to select any of the 1,000 different address or address locations in each of the memories 45 through 54.

The sequence of operation of the multivibrators 71 and 76, which together constitute a free running multivibrator system, is to first apply an output pulse from the multivibrator 76 to the CLCTR counter advance input terminal of the counters 66 through 69. When this pulse terminates, the multivibrator 71 is set to its astable condition; and the pulse passed by the OR gate 72 is applied through both of the NOR gates 73 and 74 to the memories 45 through 54. The output of the NOR gate 73 is a short duration negative going pulse which enables the "write" input (WREN) of the memories 45 through 54. Data can only be written into the memories 45 through 54 only when this pulse is present, otherwise the memories operate strictly as read only memories. At the same time, the address enable (ADDEN) for permitting the reading of data out of or the reading of data into the memories 45 through 54 is obtained in the form of a negative going pulse from the output of the NOR gate 74. The other input to the NOR gate 74 is normally low, so that its output also is low at the time the positive pulse is obtained from the output of the OR gate 72.

A particular memory then is selected for addressing and for writing of data into it when the WREN output of the NOR gate 73 is low and the ADDEN output of the NOR gate 74 is low, simultaneously with the low output obtained from the selected inverted output of the BCD-to-decimal converter 58 to select one of the ten memory units 45 through 54. Only the selected one of the memory units is permitted to respond to the writing of data into the address selected by the binary address signals on the leads A0 through A9 at any given time. These addresses are changed sequentially by the stepping of the counters 66 through 69 under the control of the clock pulses CLCTR appearing at the output of the multivibrator 76.

The particular data which is written into the addressed location of the selected one of the memories 45 through 54 at each different step or cycle of operation of the multivibrator set 71/76 is established by the particular direction of operation of the switch 60. If the switch 60 is initially operated to its upper contact (initially "good"), a flip-flop 80 is direct set to cause its "Q" output to go high. This output is applied to one of two inputs of a NAND gate 81, the other input to which is obtained from the "Q" output of the flip-flop 38. As described previously the "Q" output of the flip-flop 38 also is high at this time. This means that the output of the NAND gate 81 goes low, and this output is applied to one of two inputs of a NOR gate 83. The other input of the NOR gate 83 is obtained from the output of a NAND gate 84, which has one input obtained from the "Q" output of a flip-flop 87 and the other input obtained from the Q output of the flip-flop 38. Since the Q output of the flip-flop 38 is low at this time, the output of the NAND gate 84 is high, irrespective of the condition of the output of the flip-flop 87. Thus, the NOR gate 83 has one low input applied to it and one high input applied to it. As a consequence, its output is "high", indicative of a binary "1" on the output terminal MDI of the gate 83. This constitutes the data input signal (shown on the right hand side of FIG. 4) applied in common to the data input terminals of all of the memory units 45 through 54. Thus, when the write pulse WREN appears on the output of the NOR gate 73, this binary "1" is written into the selected address location in the selected memory unit.

If, on the other hand, the initializing switch 60 was initially switched to contact its lower contact (initial "bad" or "non-valid"), the flip-flop 80 is set to its reset condition, providing a low output on its "Q" output terminal. Under this condition of operation the output of the NAND gate 81 goes high; so that both inputs to the NOR gate 83 are high. The output of the NOR gate 83 then goes low, representing a memory data input (MDI) for a binary "0". This then would constitute the data stored in the selected address locations of the memory units 45 through 54 so long as the system remains in this initializing mode of operation. The selected data, either binary "1" (valid) or binary "0" (non-valid) is written into each of the address locations of the memory 45 to 54 under the control of the system which steps the counters 66 through 69. When 10,000 counts representative of the 10,000 addresses for the memories 45 through 54 have been reached, an output is obtained from the last counter stage 69 on an output terminal and constitutes a final count (SPCNT) from the counter 69. This output is applied to the clock input of the flip-flop 38 and causes the flip-flop 38 to be reset to its initial state of operation. Thus the "Q" output goes low and the Q output goes high. This in turn removes the enabling inputs of the one-shot multivibrators 71 and 76; so that the operation of the free running multivibrator 71/76 is terminated. Thus, no longer are any write enable (WREN) pulses applied to the memories from the output of the NOR gate 73; and no longer is the address enable (ADDEN) control of the memories effected by the output of the OR gate 72 through the NOR gate 74.

Once the initial clearing of the memories 45 through 54 described above has been effected, individual ones of the memory address locations can be changed to store indicia opposite that which has been set into the memory initially for the purpose of utilizing the system as a verification check system or a "lock-out" system. For example, if all of the memory address locations were initially set to store a binary "1" (valid) this means that uniquely encoded verification data on the credit cards used in the system is assumed to be "valid". If it is desired to prevent the use of any particular credit card in the system, it is necessary to change the binary "1" to a binary "0" at the address location corresponding to the validity data encoded on that card. To do this, the validity identification word or data for such a card or customer is transmitted from the central processor 11 through the modems 10 and 15 preceded by a mode control binary encoded word which is decoded by the mode control circuit 19 to place the switch 35 in its upper or "set" position, as shown in FIG. 2. The initializing switch 60, however, is not operated since no initilizing code is transmitted at this time. Consequently the outputs of the EXCLUSIVE OR gates 36 and 37 are reversed from the conditions described previously. That is, the output of the gate 36 is high and the output of the gate 37 is low. This causes the switch gates 40 through 43 to be operated to connect the upper four inputs of each of these gates with their respective outputs. As a result, the outputs of the counters 66 through 69 no longer control the address selection of the various memories. Instead, control of the address selection is effected by the address decoding circuit 20 which decodes the address supplied to it from the central processor 11 through the modem 15 to a uniquely encoded BCD word corresponding to the selected credit card (either individual card or customer identification) which is to be prevented or locked out from functioning to operate the system with which the verification logic of FIGS. 2, 3 and 4 is associated.

The address decoding circuit 20 has a capability of decoding any one of the 10,000 different addresses which can be located and stored in the memory units 45 through 54. The unique combinations of BCD words corresponding to these addresses are applied through the switch gates 40 to 43 to selected a particular address corresponding to the desired card which is to be locked out of the system. If the system previously had all of the memory locations set "valid", that is storing a binary "1", a subsequent control signal transmitted from the processor 11 is supplied through the mode control circuit 19 produce a positive pulse through an OR gate 96 to the clock input of a one-shot multivibrator 97. This is accomplished electronically by the mode control circuit 19 and is indicated in FIG. 2 by momentarily moving the switch contact of the switch 95 to its lower position.

This same pulse is applied to the reset terminal of a flip-flop 87 to cause its "Q" output to go low, if this output already was not low. Since the flip-flop 38 already is in its reset condition of operation (with its "Q" output low), the result of this operation is to cause the output of the NOR gate 83 to go low. This means that the memory data input signal (MDI) is representative of a binary "0" or "non-valid" indicia for the selected address. The pulse produced by the one-shot multivibrator 97 is applied through the OR gate 72 in the same manner described previously to cause the writing of the data information appearing on the terminal MDI into the selected address of the memory. At the termination of the pulse from the one-shot multivibrator 97, no further operation of the circuit takes place until the switch 95 is again pulsed to apply a positive going pulse to either one of its two output terminal as indicated in FIG. 2.

In the event that the initializing of the data storage in all of memory units 45 through 54 was to cause them to store a binary "zero" the system can be individually operated to store a binary "1" in each of the selected address locations in the same manner described above for an initial initialization of binary "1" in the system. This merely reverses the outputs of the NOR gate 83 to a high binary "1" output from that described above by a reversal of the state of the flip-flop 87. The operation of the one-shot multivibrator 97 is the same. Thus, for each different address location selected by the operation of the address decoding circuit 20, a different selection of an address or binary bit location in the memories 45 through 54 may be made to change or store the desired data at that address location in the same manner described above.

If it is desired merely to check the condition of an address location without writing new data into the memory, the switch 95 is not operated in response to any signal applied to the mode control circuit 19. Instead, a signal is applied to the mode control circuit 19 to cause it to connect the switch 35 to its upper "set" position as shown in FIG. 2. The condition of the switch gates 40 through 43 then remains as described above for the setting of information from the address decoding circuit 20 into the memory. A check switch 99 is operated in response to a verification check control signal transmitted from the central processor and decoded by the circuit 19 to move it from a normally unconnected position, as shown in FIG. 2, to its lowermost position. This triggers a one-shot multivibrator 100 into operation to produce a pulse through an OR gate 101 to the lower input of the NOR gate 74. Since the upper input of this NOR gate is low at this time, the positive going pulse supplied to the lower input produces a short duration negative pulse on the output of the NOR gate 74. The output of the NOR gate 73, however, remains high at this time; so that the address location which has been selected by the address decoding circuit 20 may be used to produce a read out on the common output terminal MD0 from the memory units. This output then is representative of the data stored at that address location in the memories 45 through 54, effectively causing the system to be operated as an ROM memory system (read only memory).

Data read out of the memory is applied through a first inverter 103 to the base of an NPN transistor 105 connectd in series with an indicator lamp 106 between the switch 35 and ground. The output of the inverter 103 is supplied through a second inverter 107 to the base of a second NPN transistor 108, which in turn is connected in series circuit with a second indicator lamp 109 and ground. Thus, one or the other of the lamps 106 or 109 is illuminated depending upon whether a binary "1" or a binary "0" was stored at the selected address location in the memory. Typically, the lamp 106 is a red lamp indicative of "bad" or "non-valid" status and the lamp 109 is a green lamp indicative of "good" or "valid" status of the selected address. This provides users of the system with a ready visual reference of the status of the selected addresses.

Assume now that the system initially has been set up and that some selected address locations of the memory units 45 through 54 have been set to store a binary digit representative of a "non-valid" credit card which is to be locked out of the system or prevented from using the system to obtain products or services in response to use of the card. As described previously, the normal operation of the system other than the initializing operation or the setting of the memory for specific address locations or checking of specific address locations by way of the switches 90 through 93, is for the switch 35 to be placed in its lowermost (NORM) position. In this position, the various other circuit switches of FIG. 2 which have been described above are rendered inoperative. Particularly, no writing of data into the memory can be obtained from the output of the NOR gate 73 since its output continues to be high at all times when the switch 35 is in its lowermost or "NORM" position. In the normal condition of operation of the system, the addressing of the memory is effected through the counters 66 through 69 which now are operated as jam input counters. With the switch 35 in its lowermost position, the output of the EXCLUSIVE OR gate 37 is high and that of the EXCLUSIVE OR gate 36 is low; so that the switch gates 40 through 43 are enabled to supply the information connected to the lowermost four leads of each of these gates to the outputs of the gates. This means that the counters are in control, and the address decoder circuit 20 is prevented from having any effect on the operation of the system.

Various types of data are encoded on the credit cards or document cards inserted into the card reader 25. Some columns of this data include the unique information used to identify the vehicle and/or customer. This is the information which is checked in the verification circuit of FIGS. 2, 3 and 4 to determine whether that card is one which is valid for use in the system, that is, whether that particular card can be used to obtain products from the system controlled by the verification logic and the circuitry described previously. This data is checked during clock pulses 5, 6, 7 and 8 (from a clock, not shown here, but corresponding to the clock 27 of the Kubina '140 patent) and the terminals to which these clock pulses are applied are shown in the lower lefthand corner of FIG. 2. The eight rows of data in any column of a card inserted into the card reader of the system described in the Kubina U.S. Pat. No. 4,114,140 are applied in two groups of four to the jam input counters 66 through 69. For example, rows 1 through 4 are connected in parallel to the inputs of the counters 67 and 69, while rows 5 through 8 are connected in parallel to the inputs of the counters 66 and 68. To provide additional security and additional flexibility in the programming of the system, the data on these rows is alternately read simultaneously into the counters 68 and 69 and simultaneously at a different time into the counters 66 and 67. Thus two different columns of data each comprising 8 rows of binary information are stored in the counters 67 through 69 to select the one of the 10,000 address locations in the memories 45 through 54 (FIG. 4) which corresponds to the data read from the cards.

To control which of the columns on the cards are used to enter this data, a manually operated preset switch bank 115 is provided. This switch bank includes a first pair of switches 116 and 117 connected to one input of an AND gate 120. A second pair of switches 121 and 122 are connected to one input of a second AND 124. The other inputs to the gates 120 and 124 are obtained in common from the output of an AND gate 126 which is provided with two inputs, the STRB and the ENGD inputs. These inputs correspond to the similarly identified inputs of the system disclosed in U.S. Pat. No. 4,085,313. All that is necessary for the purposes of this disclosure is that the output of the gate 126 is high at the time the clock pulses CL5, CL6, CL7, and CL8 occur. Only one of the two switches 116 or 117 is closed and only one of the two switches 121 or 122 is closed to control the particular time of occurance of the clock pulse which is applied to each of the gates 120 and 124. These clock pulses are applied to read different columns of information from the card reader; so that by grouping the pulses in this manner different groups of data may be used for verification purposes. In addition, the arrangement of closure of the switch combinations 116/117 and 121/122 can be varied at any time the programming for the system is to be changed.

The contents 66 and 67 are enabled to respond to the data appearing on their inputs as jam input data whenever a positive output (EN-B) is obtained from the AND gate 124. Similarly the counters 68 and 69 are enabled to store, as jam input counters, the data appearing on the inputs supplied to them whenever a positive output (EN-A) is obtained from the gate 120.

At the time the subsequent ninth clock pulse, CL9 occurs, it is applied to one input of an AND gate 131, which is enabled on its other input from the ENGT signal of FIG. 1. This produces a positive output through the OR gate 101 which is applied to the NOR gate 74 to create a negative going address enable pulse to the memories 45 through 54. This permits the memories to be read for the selected address to produce an output signal on the output lead MDO corresponding to the "valid" or "non-valid" binary bit indicia which is stored at that address. This binary output signal from the memories is applied to the lower one of two inputs to a negative logic NAND gate 133, the upper input to which is obtained from the output of a positive logic NAND gate 135. Whenever a clock pulse CL9 occurs, the upper input to the NAND gate 133 goes low; and this gate is used to sample the data on the common output MDO from the memories. The output of the NAND gate 133 then is passed through an inverter 136 to constitute the output signal to the rest of the system to signify whether the validity check logic found the card being checked to be "valid" or "non-valid". If the card is "non-valid", the MDO signal is used by the system to prevent operation of the system to withdraw products or to obtain services. If the card checks out "valid" normal use of the system for its designated function is permitted.

Any "valid" card subsequently can be locked out of the system by encoding its identifying BCD word (or words) by transmitting a signal for the corresponding address indicative of a "non-valid" status through the address decoding circuit 20 during the updating of the validity memory 45 through 54. At the end of such an updating, the stored binary bit for such a card at the address location for that card in the memories 45 to 54 is changed from "valid" (binary "1") to "non-valid" (binary "0"). Similarly, any bit stored for a locked out or "non-valid" card can be changed back to "valid" whenever the credit status for that card changes to an acceptable status. By utilization of the central processor 11 to transmit updated information for the lockout or transaction verification memory 17 on a regular periodic basis or as the necessity for a change in the status of the verification memory 17 occurs, a highly flexible system is obtained. Thus, it is no longer necessary to physically visit each of the remote locations at which card readers or business transactions are to take place in the system to set or update the transaction verification memories. Instead, the updating of the memory is accomplished automatically from the central processing station associated with all of the outlying remote locations. In all other respects the system functions at the utilization point in the same manner as the system of the U.S. Pat. No. 4,114,140.

I claim:

1. A system for providing a verification check of uniquely encoded multibit binary words at a plurality of remote locations, the system having a central station for supplying address signals and verification "valid/non-valid" control signals through a transmission link interconnecting said central station with each of said plurality of remote locations, each of said remote locations including in combination:

read/write memory means having a plurality of address locations therein, each address location storing a single binary bit indicative of the "valid/non-valid" status of the item represented by each such address location, said memory means further having a single output on which an output signal is produced corresponding to the binary bit stored at the address location selected in said memory means;

lockout utilization means coupled to the output of said memory means and operated in response to output signals appearing thereon;

address control means operated in response to addressing signals and coupled to said memory means for selecting particular address locations for the writing of bits into and the reading of bits from those address locations of said memory means;

read/write control means coupled to said memory means and further coupled with said transmission link and responsive to signals applied thereto from said central station over said transmission link for controlling the read/write mode of operation of said memory means and for supplying said verification control signals to said memory means to selectively change the "valid/non-valid" status of the binary bits stored in said memory means when said memory means is in the write mode of operation;

gating circuit means having a plurality of inputs and having outputs coupled with said address control means for supplying said addressing signals thereto;

address decoding means coupled to selected inputs of said gating circuit means and further coupled with said transmission link and responsive to address signals supplied thereto from said central station over said transmission link for supplying address input signals to said gating circuit means;

further circuit means coupled to others of the inputs of said gating circuit means for supplying input addressing signals thereto; and selecting means coupled with said read/write control means and operated thereby and further coupled to said gating circuit means for causing the signals appearing on the outputs of said gating circuit means to be selected from the input signals from said address decoding means or the input signals from said further circuit means, thereby causing the signal on the output of said memory means to correspond to the binary bit stored at the address location selected by the addressing signals from said gating circuit means.

2. The combination according to claim 1 wherein said gate means comprises a multiple-pole, double-throw switching circuit means.

3. The combination according to claim 1 further including initializing circuit means coupled with said read/write control means and operated thereby and coupled with said address control means for initially causing said memory means to store binary bits of the same type in all of said plurality of address locations.

4. The combination according to claim 3 wherein said system further includes "set" control means coupled with said read/write control means and said selecting means for causing said memory to be placed in its "write" mode of operation and for causing said gate means to supply addressing signals to said address control means from said address decoding means; and means for causing binary bits having a predetermined binary characteristic to be stored in said memory means at the address location selected by said address decoding means.

5. The combination according to claim 4 wherein said selecting means further includes means for causing said memory means to operate as a read-only memory means when said selecting means causes said gating circuit means to provide addressing signals on the outputs thereof in response to input signals applied thereto from said further circuit means.

* * * * *